US011952750B2

(12) United States Patent
Imamura et al.

(10) Patent No.: US 11,952,750 B2
(45) Date of Patent: Apr. 9, 2024

(54) WORK MACHINE

(71) Applicant: HITACHI CONSTRUCTION MACHINERY CO., LTD., Tokyo (JP)

(72) Inventors: Shota Imamura, Tsuchiura (JP); Yuji Nagashima, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 516 days.

(21) Appl. No.: 17/272,692

(22) PCT Filed: Dec. 11, 2019

(86) PCT No.: PCT/JP2019/048445
§ 371 (c)(1),
(2) Date: Mar. 2, 2021

(87) PCT Pub. No.: WO2020/183829
PCT Pub. Date: Sep. 17, 2020

(65) Prior Publication Data
US 2021/0340732 A1    Nov. 4, 2021

(30) Foreign Application Priority Data

Mar. 8, 2019  (JP) .................................. 2019-042923

(51) Int. Cl.
*E02F 9/24*        (2006.01)
*B60K 26/02*       (2006.01)
(Continued)

(52) U.S. Cl.
CPC ................ *E02F 9/24* (2013.01); *B60K 26/02* (2013.01); *B60K 35/00* (2013.01); *E02F 9/16* (2013.01);
(Continued)

(58) Field of Classification Search
CPC ....... E02F 9/24; E02F 9/16; E02F 9/26; E02F 3/32; B60K 35/00; B60K 26/02;
(Continued)

(56) References Cited

U.S. PATENT DOCUMENTS

2018/0187397 A1*  7/2018  Fujita .................. H04N 9/3155
2019/0308502 A1   10/2019  Yoneyama
(Continued)

FOREIGN PATENT DOCUMENTS

JP   2009-173195 A   8/2009
JP   2013-533406 A   8/2013
(Continued)

OTHER PUBLICATIONS

International Search Report of PCT/JP2019/048445 dated Mar. 3, 2020.

*Primary Examiner* — Mahmoud S Ismail
(74) *Attorney, Agent, or Firm* — MATTINGLY & MALUR, PC

(57) ABSTRACT

The present invention provides a working machine that makes it possible to alert its operator to cautions properly without obstructing the view of the operator. The working machine includes a cab for its operator to ride in, a projection device that projects image light to form an image of cautions to an operator who operates the working machine, a display unit that displays image light projected by the projection device, state detection element to detect a state of the working machine, and a controller that controls the projection device so that a manner of displaying the cautions on the display unit will change depending on the state of the working machine detected by the state detection element.

3 Claims, 5 Drawing Sheets

(51) Int. Cl.
    *B60K 35/00*     (2006.01)
    *E02F 9/16*     (2006.01)
    *E02F 9/26*     (2006.01)
    *E02F 3/32*     (2006.01)
    *G02B 27/01*     (2006.01)

(52) U.S. Cl.
    CPC ........ *E02F 9/26* (2013.01); *B60K 2370/1529* (2019.05); *B60K 2370/167* (2019.05); *B60K 2370/168* (2019.05); *B60K 2370/178* (2019.05); *E02F 3/32* (2013.01); *G02B 27/0101* (2013.01); *G02B 2027/0141* (2013.01)

(58) Field of Classification Search
    CPC ...... B60K 2370/1529; B60K 2370/167; B60K 2370/168; B60K 2370/178; G02B 27/0101; G02B 2027/0141
    USPC .......................................................... 701/50
    See application file for complete search history.

(56) References Cited

U.S. PATENT DOCUMENTS

2021/0174660 A1*   6/2021   Kamimura ................ E02F 9/26
2023/0016174 A1*   1/2023   Choi .................. G02B 27/0179

FOREIGN PATENT DOCUMENTS

| JP | 2015-34935 A | 2/2015 |
|---|---|---|
| WO | 2017/043107 A1 | 3/2017 |
| WO | 2017/051655 A1 | 3/2017 |
| WO | 2018/116601 A1 | 6/2018 |
| WO | 2018/131241 A1 | 7/2018 |

* cited by examiner

WORK MACHINE

TECHNICAL FIELD

The present invention relates to a working machine.

BACKGROUND ART

Patent Literature 1 discloses a working machine in which a decal is attached to a window glass of a cab. This decal is used as a so-called "caution label" for, e.g., alerting an operator to various cautions for operating the working machine.

CITATION LIST

Patent Literature

Patent Literature 1: Japanese Patent Application Laid-Open (Translation of PCT Application) No. 2013-533406

SUMMARY OF INVENTION

Technical Problem

As working machines have been made multifunctional in recent years and along with increased awareness of safety, there is an increase in the number of decals to be attached to a window glass. Consequently, it becomes difficult to attach all decals in position so as not to obstruct the view of an operator.

The present invention has been developed in view of the actual circumstances noted above and an object of the present invention resides in providing a working machine that makes it possible to alert its operator to cautions properly without obstructing the view of the operator.

Solution to Problem

To achieve the foregoing object, the present invention resides in a working machine provided with a cab for its operator to ride in. The working machine is characterized by including a projection device that projects image light to form an image of cautions to an operator who operates the working machine, a display unit that displays image light projected by the projection device, state detection element to detect a state of the working machine, and a controller that controls the projection device so that a manner of displaying the cautions on the display unit will change depending on the state of the working machine detected by the state detection element.

Advantageous Effects of Invention

According to the present invention, it is possible to alert an operator to cautions properly without obstructing the view of the operator. Problems, structures, and advantageous effects other than described above will be made apparent from the following description of an embodiment.

DESCRIPTION OF EMBODIMENT

Figure 1:
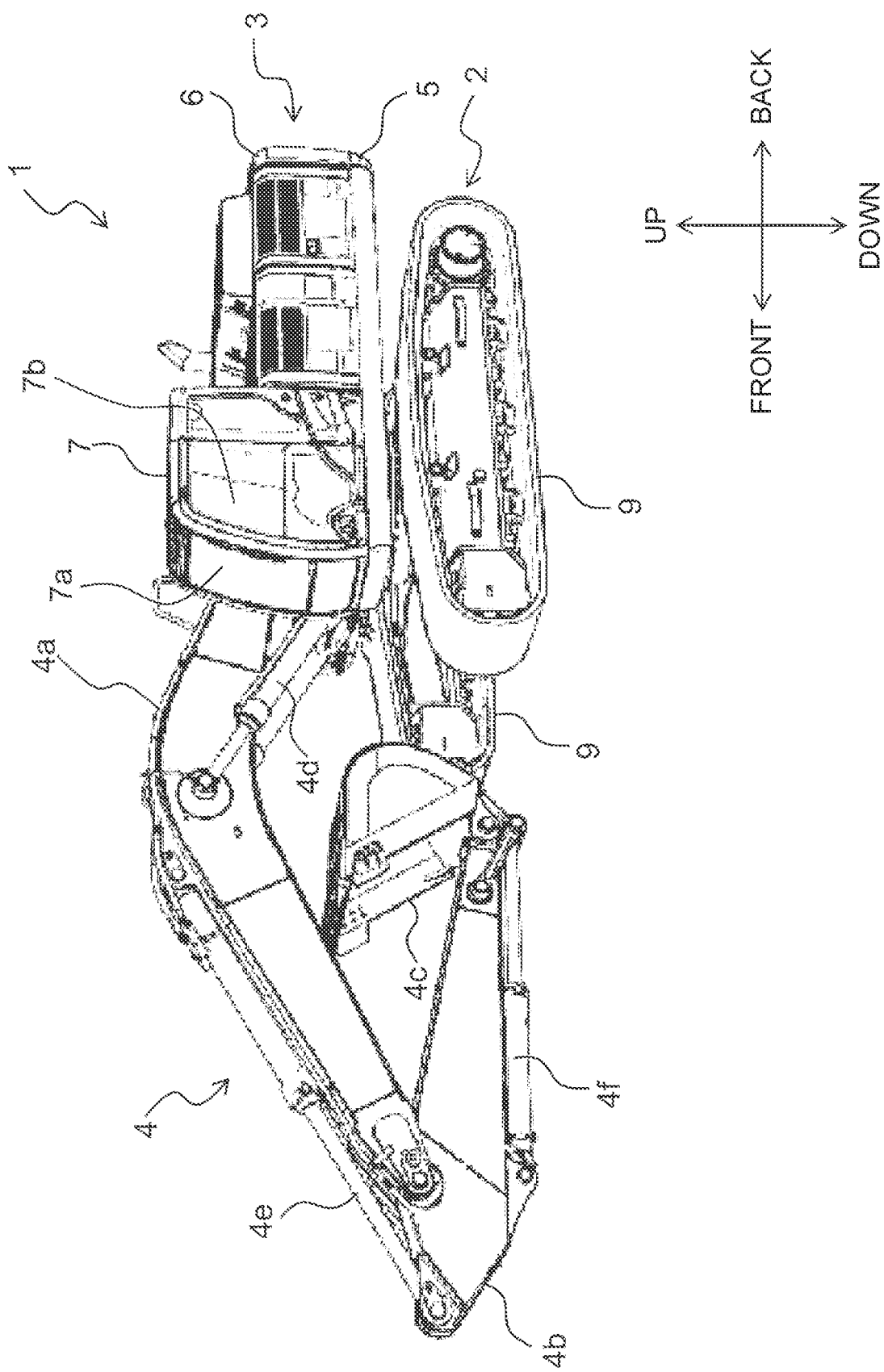
FIG. 1 is a perspective view of a hydraulic excavator which is a representative example of a working machine pertaining to the present invention.
Figure 2:
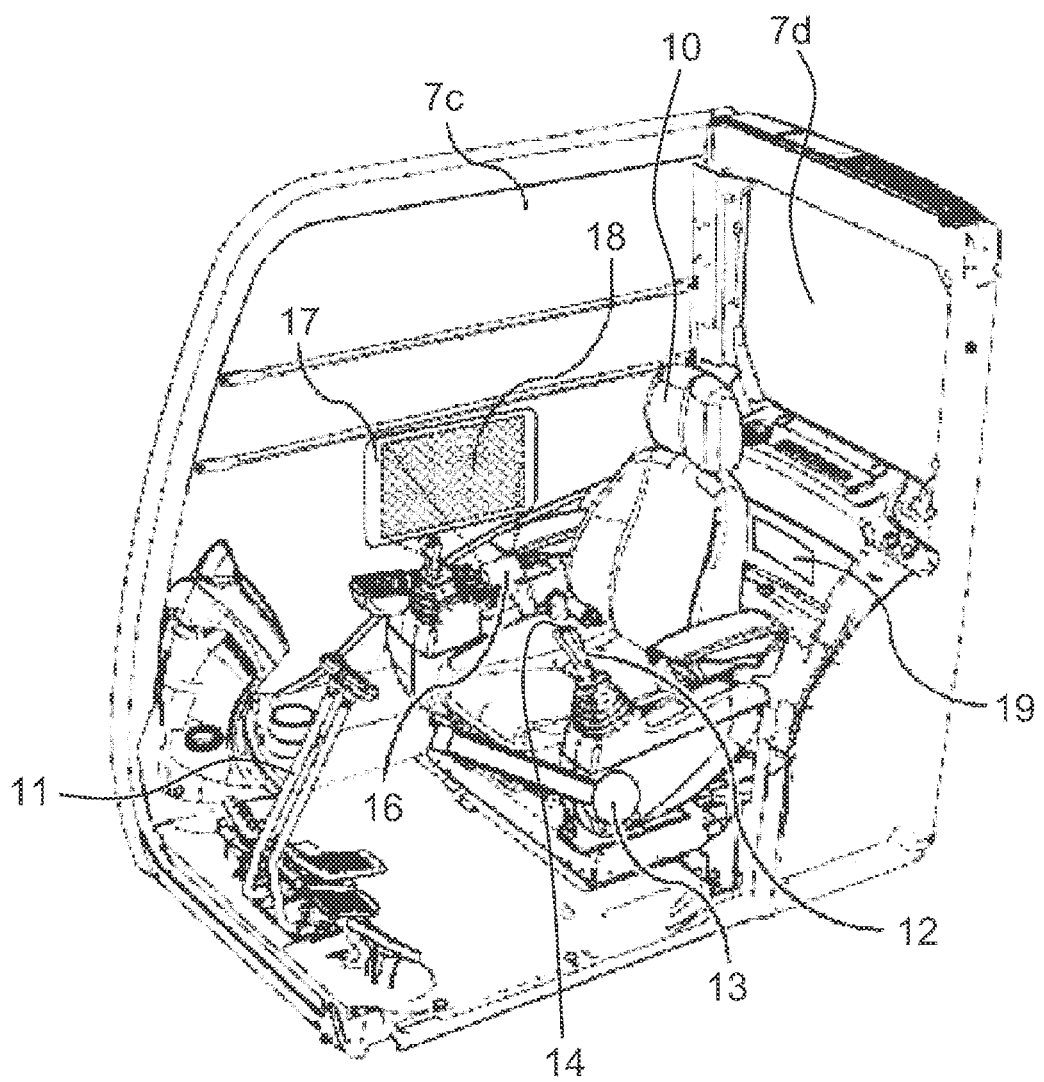
FIG. 2 is a perspective view of a cab that viewed from the doorway side.

An embodiment of a working machine pertaining to the present invention is described with the aid of the drawings. FIG. 1 is a perspective view of a hydraulic excavator 1 which is a representative example of a working machine pertaining to the present invention. FIG. 2 is a perspective view of a cab 7 that viewed from the doorway side. Note that front, back, left and right mentioned herein are based on the viewpoint of an operator who rides in the hydraulic excavator 1 and operates it, unless otherwise noted.

The hydraulic excavator 1 includes an undercarriage 2 and an upperstructure 3 supported on the undercarriage 2. The undercarriage 2 is equipped with a pair of left and right crawlers 9. Driving force of a traction motor (omitted from depiction) is transmitted to the pair of crawlers 9 and the crawlers rotate. However, the undercarriage 2 may be equipped with wheels instead of the crawlers 9.

The upperstructure 3 is supported on the undercarriage 2 so as to be swingable by a swing motor (omitted from depiction). The upperstructure 3 includes, principally, a swing frame 5 serving as a base, a front working device 4 (a working device) installed in the front center of the swing frame 5 so as to be turnable in a vertical direction, a cab (with a driver's seat) 7 placed at left in a front part of the swing frame 5, a counterweight 6 placed in a rear part of the swing frame 5, and a battery 8 (see FIG. 3).

The front working device 4 includes a boom 4a supported on the upperstructure 3 so as to be raised and lowered, an arm 4b swingably supported on a forward end of the boom 4a, a bucket 4c swingably supported on a forward end of the arm 4b, and hydraulic cylinders (actuators) 4d to 4f for driving the boom 4a, arm 4b, and bucket 4c.

The counterweight 6 is a heavy object for weight balancing with the front working device 4. The battery 8 stores electric power generated by a generator (omitted from depiction) which is driven by an engine (omitted from depiction) and supplies stored electric power to respective parts of the hydraulic excavator 1.

The cab 7 has a box form with an internal space formed for an operator who operates the hydraulic excavator 1 to ride in. As depicted in FIG. 1 and FIG. 2, the cab 7 is provided with a front window 7a, a left side window 7b, a right side window 7c, and a rear window 7d for the operator who rides in the internal space to see outside the cab 7.

Also, a doorway for the operator to enter and exit the cab 7 is provided in the left side of the cab 7. In the internal space of the cab 7, moreover, there are disposed a seat 10 for the operator to sit on and operating devices (steering, pedals, levers, switches, etc.) that will be operated by the operator sitting on the seat 10.

By operating the operating devices by the operator who rides in the cab 7, the undercarriage 2 travels, the upperstructure 3 swings, and the front working device 4 operates. The operating devices include a travel control lever 11, a front control lever 12, a gate lock lever (a lock operating element) 13, a push button 14, and a key switch 15 (see FIG. 3). The gate lock lever 13, the push button 14, and the key switch 15 are examples of state detection element to detect a state of the hydraulic excavator 1.

The travel control lever 11 controls the rotational speed and rotational direction of the pair of crawlers 9. That is, by operating the travel control lever 11 by the operator, the undercarriage 2 moves forward and backward and turns. The front control lever 12 controls extension and shortening of the hydraulic cylinders 4d to 4f. That is, by operating the front control lever 12 by the operator, the front working device 4 operates.

The gate lock lever 13 is configured to enable switching between a locked state in which operation of the hydraulic excavator 1 (i.e., the traction motor, the swing motor, and the hydraulic cylinders 4d to 4f) is disabled and an unlocked state in which operation of the hydraulic excavator 1 is enabled. The gate lock lever 13, for instance, outputs an operation signal to a controller 20 in a case where it is in the unlocked state.

In other words, while an operation signal is not output from the gate lock lever 13, the hydraulic excavator 1 does not operate even if the operator operates the travel control lever 11 and the front control lever 12. Conversely, while an operation signal is output from the gate lock lever 13, the hydraulic excavator 1 operates according to operation of the travel control lever 11 and the front control lever 12 by the operator.

The gate lock lever 13 is, for example, placed between the doorway of the cab 7 and the seat 10. The gate lock lever 13 is set in the unlocked state in a case where it is pulled down to a position as in FIG. 2. At this time, the gate lock lever 13 projects into a passage between the doorway of the cab 7 and seat 10 and prevents the operator from getting on and off the cab 7. On the other hand, the gate lock lever 13 is set in the locked state in a case where it is pulled up from the position as in FIG. 2. At this time, the gate lock lever 13 gets out of the passage between the doorway of the cab 7 and seat 10 and does not prevent the operator from getting on and off the cab 7.

The push button 14 is a momentary switch that is set in an ON state only while it is pressed (operated) by the operator and set in an OFF state in a case where the operator stops pressing. The bush button 14, for instance, outputs an operation signal to the controller 20 only while it is in the ON state. In the present embodiment, the front control lever 12 is provided with the push button 14 in its top end; however, the position where the push button 14 is placed is not limited to this position.

The key switch 15 is a switch to start and stop the engine. For instance, inserting a key in the key switch 15 and rotating it up to a first position causes an alternator to rotate and the engine to start (ON state). On the other hand, rotating the key up to a second direction causes the engine to stop (OFF state). Note that the key switch 15 may be configured to make it impossible to rotate the key up to the first position in a case where the gate lock lever is not set in the locked state.

Besides, in a case where the key switch 15 is in the ON state, electric power stored in the battery 8 is supplied to a projection device 16 and the controller 20. On the other hand, in a case where the key switch 15 is in the OFF state, no electric power is supplied to the projection device 16 and the controller 20. Furthermore, the key switch 15 may be configured to make it possible to rotate the key to a third position, so that electric power will be supplied to the projection device 16 and the controller 20 while the engine remains deactivated (battery driving state).

In the internal space of the cab 7, the projection device 16 and a combiner (display unit) 17 are installed. The projection device 16 and the combiner 17 constitute an HUD (Head-up Display) unit to display information that should be conveyed to the operator as alerts.

The projection device 16 projects image light to form an image (a still or moving image) on the combiner 17 according to control by the controller 20. That is, the projection device 16 projects the image light to be incident at a predetermined angle on the combiner 17. Because a concrete structure of the projection device 16 is already known well, its detailed description is omitted.

The combiner 17 is a transparent plate-shaped (filmy) member and it is attached to a window of the cab 7. The combiner 17 pertaining to the present embodiment is attached to a portion of the right side window 7c. However, the position where the combiner 17 is placed is not so limited and it may be placed in the front window 7a, the left side window 7b, or the rear window 7d. Besides, it is not restrictive that the combiner 17 is configured to be attached to an existing window glass; a window glass having functionality of the combiner 17 may be installed to the cab 7. That is, the display unit may be a window glass.

The combiner 17 is a so-called "half mirror" that transmits light incident on the right side window 7c from outside the cab 7 and reflects the image light projected by projection device 16 to a position of eyes of the operator sitting on the seat 10. In other words, the operator sitting on the seat 10 can see outside the cab 7 through the combiner 17 and, also, an image formed by the image light projected by projection device 16 appears to be displayed on the combiner 17.

Besides, the HUD unit configured as mentioned above makes the operator sitting on the seat 10 see a virtual image. Hence, the HUD unit can set the seeing distance of an image displayed on the combiner 17 to infinity. That is, the operator sitting on the seat 10 can see conditions surrounding the hydraulic excavator 1 and an image displayed on the combiner 17 without changing the focal length to a great extent.

The HDU unit pertaining to the present embodiment displays, for example, cautions 18 to which the operator operating the hydraulic excavator 1 should be alerted. Typically, the cautions are things that the operator should be made be aware of before starting to operate the hydraulic excavator 1. A concrete example of the cautions 18 is, for example, an image (see FIG. 5) symbolizing that abruptly starting to swing the upperstructure 3 may mow down a person surrounding the excavator.

However, concrete examples of the cautions 18 to be displayed on the combiner 17 are not limited to such image. Various cautions can be displayed to represent that the operator should wear a seat belt, that the opened front window 7a could fall, that the hydraulic excavator 1 could fall on sloping ground, that an electric shock could occur if the front working device 4 touched an electrical wire, and so on.

Furthermore, a decal 19 is attached to a portion inside the cab 7. The decal 19 contains the same contents as the cautions 18 to be displayed on the combiner 17. The decal 19 pertaining to the present embodiment is attached to a wall behind the seat 10 and under the rear window 7d. The position where the decal 19 is attached to is not limited to this position; desirably, the decal 19 should be attached to a position where it does not obstruct the view of the operator (e.g., a position other than the windows 7a to 7d).

Figure 3:
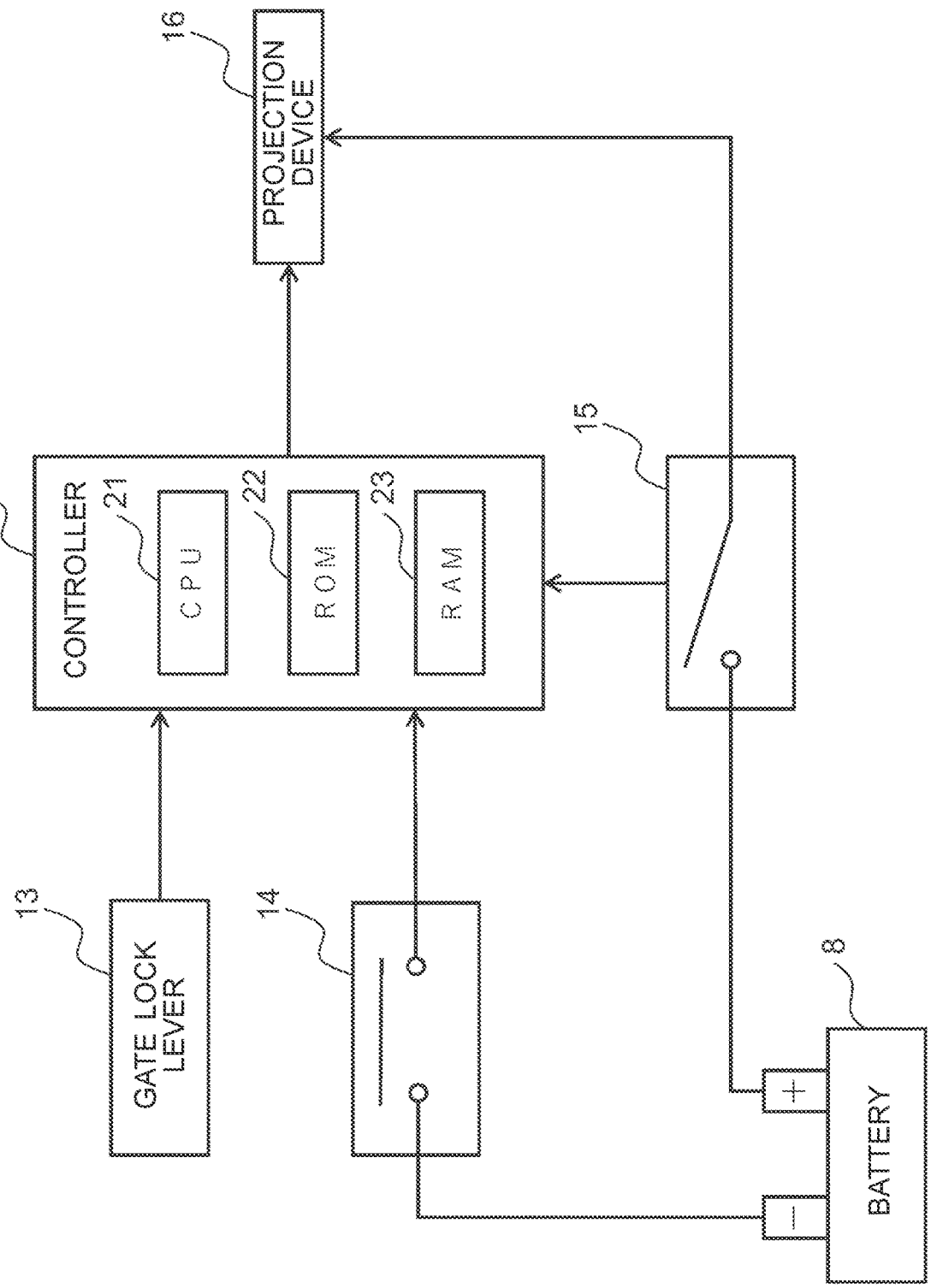
FIG. 3 is a block diagram of the hydraulic excavator.

FIG. 3 is a block diagram of the hydraulic excavator 1. The hydraulic excavator 1 includes the controller 20 that controls the HDU unit. In more detail, the controller 20 controls the projection device 16 so that a manner of displaying the cautions 18 on the combiner 17 will change depending on the states of the gate lock lever 13, push button 14, and key switch 15.

The controller 20 includes a CPU (Central Processing Unit) 21, a ROM (Read Only Memory) 22, and a RAM (Random Access Memory) 23. The controller 20 implements processing which will be described later in such a way that the CPU 21 reads and executes a program code stored in the ROM 22. The RAM 23 is used as a work area while the CPU 21 executes a program.

However, a concrete structure of the controller 20 is not so limited and the controller may be implemented by hardware such as ASIC (Application Specific Integrated Circuit) and FPGA (Field-Programmable Gate Array).

Figure 4:
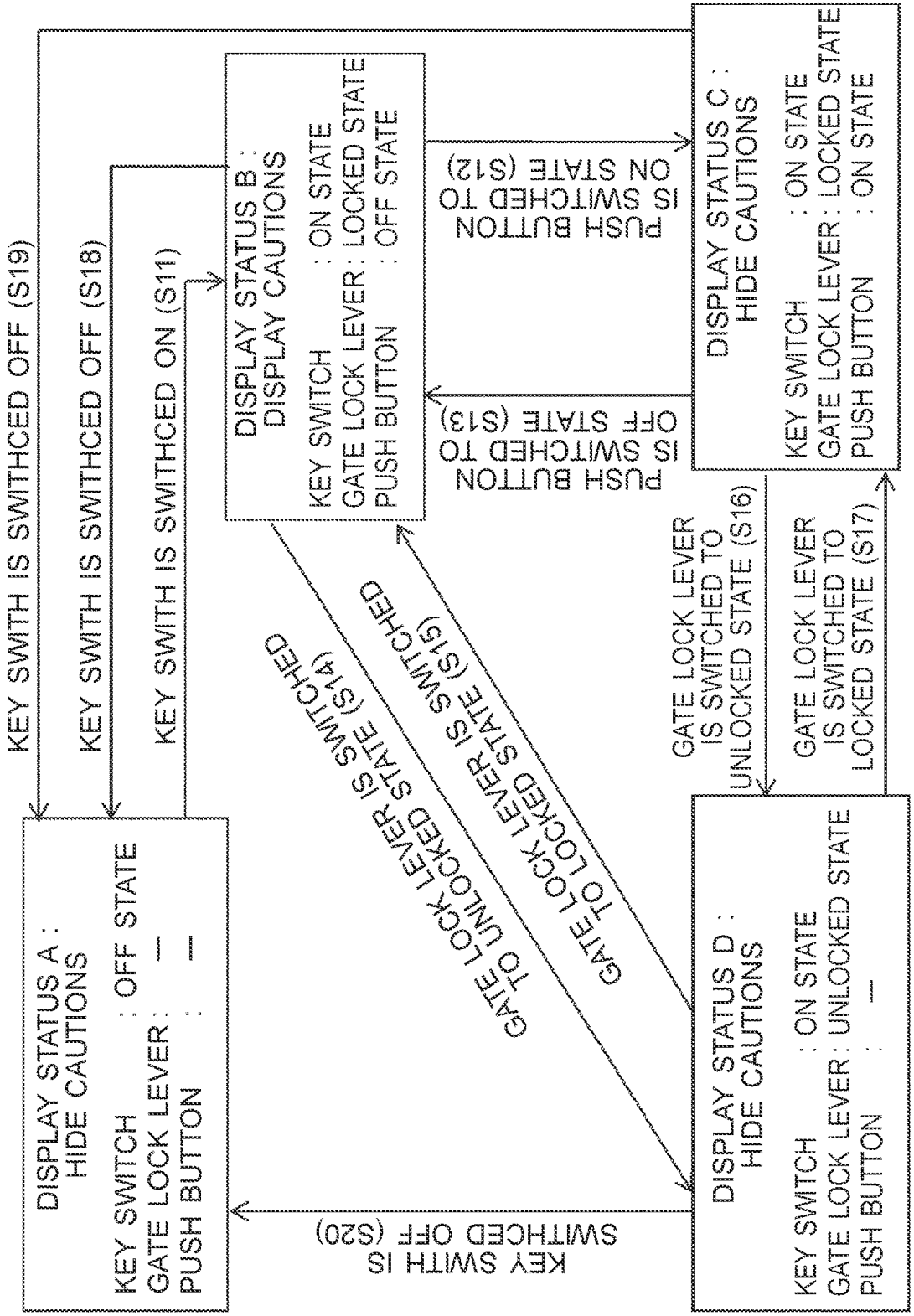
FIG. 4 is a state transition diagram representing a relationship between the states of the hydraulic excavator and a display status of cautions.

Then, operation of the controller 20 is described with reference to FIG. 4. FIG. 4 is a state transition diagram representing a relationship between the states of the hydraulic excavator 1 and the display status of the cautions 18.

Initially, in a case where the key switch 15 is in the OFF state, no electric power is supplied from the battery 8 to the projection device 16 and the controller 20. Hence, the controller 20 does not display the cautions 18 on the combiner 17 (display status A). Also, in a case where the key switch 15 is in the OFF state, the cautions 18 remain hidden (the display manner remains unchanged) even if the operator operates the gate lock lever 13 and the push button 14.

Then, n a case where the key switch 15 is switched from the OFF state to the ON state (S11) with the gate lock lever 13 remaining in the locked state and the push button 14 remaining in the OFF state, the controller 20 displays the cautions 18 on the combiner 17 (display status B).

Then, in a case where the push button 14 is switched from the OFF state to the ON state (S12) with the key switch 15 remaining in the ON state and the gate lock lever 13 remaining in the locked state, the controller 20 hides the cautions 18 displayed on the combiner 17 (display status C). Furthermore, in a case where the push button 14 is switched from the ON state to the OFF state (S13) with the key switch 15 remaining in the ON state and the gate lock lever 13 remaining in the locked state, the controller 20 displays the cautions on the combiner 17 again (display status B).

That is, while the push button 14 is not pressed with the key switch 15 remaining in the ON state and the gate lock lever 13 remaining in the locked state, the controller 20 displays the cautions 18; and while the push button 14 is pressed, the controller hides the cautions 18. In other words, the controller 20 hides the cautions 18 temporarily as long as the push button is pressed even with the gate lock lever 13 remains in the locked state.

Next, in a case where the gate lock lever 13 is switched from the locked state to the unlocked state (S14) with the key switch 15 remaining in the ON state and the push button 14 remaining in the OFF state, the controller 20 hides the cautions 18 displayed on the combiner 17 (display status D). Furthermore, in a case where the gate lock lever 13 is switched from the unlocked state to the locked state (S15) with the key switch 15 remaining in the ON state and the push button 14 remaining in the OFF state, the controller 20 displays the cautions 18 on the combiner 17 (display status B).

On the other hand, in a case where the key switch 15 remaining in the ON state and the push button 14 remaining in the ON state, even if the gate lock lever 13 is switched from the locked state to the unlocked state (S16) or even if the gate lock lever is switched from the locked state to the unlocked state (S17), the controller 20 continues to hide the cautions 18 (display status C or D).

Besides, even if the state of the push button 14 is switched with the key switch 15 remaining in the ON state and the gate lock lever 13 remaining in the unlocked state, the controller 20 continues to hide the cautions 18 (display status C). That is, the operator can switch the display status of the cautions 18 by the push button 14 in a case where the gate lock lever 13 is in the locked state, but cannot switch it by the push button 14 in a case where the gate lock lever 13 is in the unlocked state.

Then, the key switch 15 is switched from the ON state to the OFF state (S18) with the gate lock lever 13 remaining in the locked state and the push button 14 remaining in the OFF state, the controller 20 hides the cautions 18 displayed on the combiner 17 (display status A).

Furthermore, in a case where the key switch 15 is switched from the ON state to the OFF state (S19) with the gate lock lever 13 remaining in the locked state and the push button 14 remaining in the ON state, the controller 20 continues to hide the cautions 18 (display status A). Likewise, in a case where the key switch 15 is switched from the ON state to the OFF state (S20) with the gate lock lever 13 remaining in the unlocked state, the controller 20 continues to hide the cautions 18 (display status A).

According to the embodiment described above, for example, the following operational advantages are provided.

According to the foregoing embodiment, the cautions 18 are displayed on the right side window 7*c* in a case where the gate lock lever 13 is in the locked state. This allows to alert the operator to the cautions properly before starting to operate the hydraulic excavator 1. Besides, the cautions 18 are hidden in a case where the gate lock lever 13 is in the unlocked state. This enables the operator to operate the hydraulic excavator 1 safely while checking surrounding conditions since there is nothing to obstruct the view of the operator.

Besides, according to the foregoing embodiment, switching can be made between displaying and hiding the cautions 18 by the push button 14 in a case where the gate lock lever 13 is in the locked state. This enables the operator to check outside conditions by pressing the push button 14 without the operator's view being obstructed.

Besides, according to the foregoing embodiment, due to the fact that the push button 14 is a momentary switch, it is possible to prevent that the cautions 18 remain hidden after the operator presses the push button 14 to check outside conditions. However, the push button 14 may be an alternate switch that can switch between ON and OFF states each time the operator presses it.

Besides, the projection device 16 cannot display the cautions 18 while it is not supplied with electric power from the batter 8. Therefore, as in the foregoing embodiment, by attaching the decal 19 having the same contents as the cautions 18 to be displayed on the combiner 17 to the cab 7, it is possible to alert the operator to the cautions 18 even if the key switch 15 is in the OFF state. Furthermore, by attaching the decal 19 to a place other than the windows 7*a* to 7*d*, it is avoided to obstruct the view of the operator.

Figure 5:
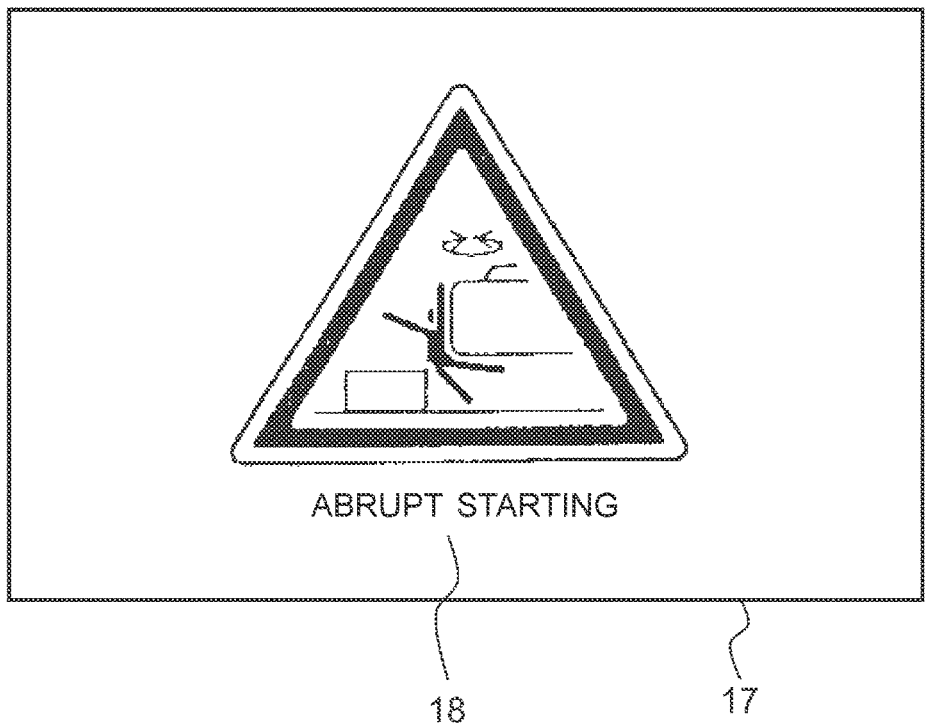
FIG. 5 is a diagram representing an example of displaying, in a large size, cautions in the center of a combiner.

Note that, in the foregoing embodiment, displaying the cautions is taken as an example of a first display manner and hiding the cautions 18 is taken as an example of a second display manner. However, concrete examples of the first and second display manners are not so limited. FIG. 5 is a diagram representing an example of displaying, in a large size, the cautions 18 in the center of the combiner 17. FIG.

6 is a diagram representing an example of displaying, in a small size, the cautions 18 in a corner of the combiner 17.

Figure 6:
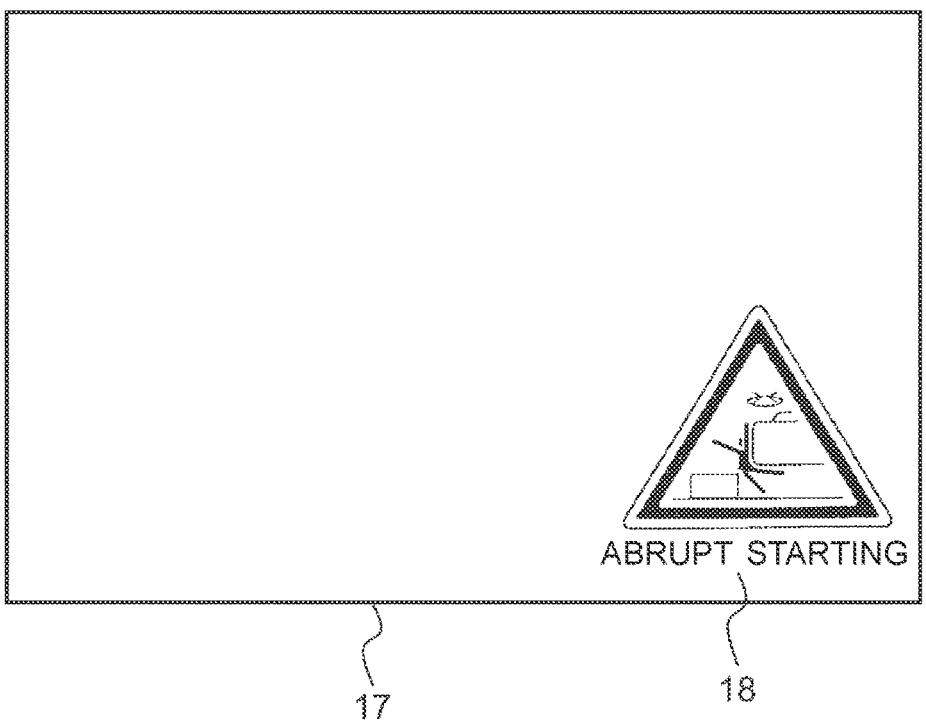
FIG. 6 is a diagram representing an example of displaying, in a small size, cautions in a corner of the combiner.

As another example of the first display manner, the controller 20 may display, in a large size, the cautions 18 in the center of the combiner 17 during display status B, as presented in FIG. 5. Besides, as another example of the second display manner, the controller 20 may display, in a small size, the cautions 18 in a corner of the combiner 17 during display status C or D, as presented in FIG. 6.

That is, the second display manner is any one or a combination of hiding the cautions 18, displaying smaller than displayed in the first display manner, and displaying near the edges of a window relative to the display position in the first display manner. As yet another example, the second display manner may be setting transmittance higher than in the first display manner, setting saturation lower than in the first display manner, and setting brightness higher than in the first display manner among others. In other words, the second display manner may be a display manner in which the displayed cautions are more likely not to obstruct the view of the operator than in the first display manner.

Furthermore, in display status C or D, different display manners may apply to the cautions 18. For example, the controller 20 may display the cautions 18 as presented in FIG. 6 during display status C or may hide the cautions 18 during display status D.

Besides, timing of switching from display status B to display status C or D may differ. For example, in a case where the push button 14 is switched from the OFF state to the ON state (S12), the controller 20 may immediately switch the display manner of the cautions 18 to another manner. On the other hand, in a case where the gate lock lever 13 is switched from the locked state to the unlocked state (S14), the controller 20 may switch the display manner of the cautions 18 to another manner upon elapse of a predetermined time (e.g., 5 seconds).

Moreover, concrete examples of the state detection element are not limited to the gate lock lever 13, the push button 14, and the key switch 15. As any other example, a tilting angle sensor that detects the tilting angle of the hydraulic excavator 1 with respect to a horizontal plane or a front window sensor that detects the front window 7a opening may be taken as a state detection element.

Furthermore, cautions 18 that are displayed at the same time on the combiner 17 are not limited to one thereof. That is, the controller 20 may display multiple cautions 18 next to each other on the combiner 17. Besides, the controller 20 may switch one of the cautions 18 to be displayed on the combiner 17 to another one according to the state of the hydraulic excavator 1 that is detected by the state detection element.

By way of example, the controller may display one of cautions that urge the operator to wear a seat belt on the combiner 17 immediately after the key switch 15 is switched from the OFF state to the ON state. Also, the controller may display one of the cautions 18 as presented in FIG. 5 on the combiner 17 upon elapse of a predetermined time after the key switch 15 is switched to the ON state.

As another example, the controller 20 may display on the combiner 17 cautions alerting that the hydraulic excavator 1 could fall on sloping ground in a case where the tilting angle that is detected by the tilting angle sensor is larger than or equal to a threshold. As yet another example, the controller 20 may display on the combiner 17 cautions alerting that the opened front window 7a could fall in a case where the front window 7a opening has been detected by the front window sensor.

Besides, while, in the foregoing embodiment, an example was described in which switching is made between displaying and hiding the cautions 18 depending on the operating state of the gate lock lever and the push button 14 in a case where the key switch is the ON state; such switching may be performed in a case where the key switch 115 is in the battery driving state. However, in order to save electric power stored in the battery 8, the controller 20 may reduce the amount of the image light that is projected from the projection device 16 in a case where the key switch 115 is in the battery driving state, as compared with that amount in a case where the key switch 15 is in the ON state.

Furthermore, a concrete example of the working machine is not limited to the hydraulic excavator 1 and may be a work vehicle such as a dump truck, a motor grader, or a wheel loader or a fixed-type machine that operates, fixed to a post.

The foregoing embodiment is illustrative to explain the present invention and is not intended to limit the scope of the present invention solely to the embodiment. Those skilled in the art may carry out the present invention in other various ways without departing from the gist of the present invention.

REFERENCE SIGNS LIST

1: hydraulic excavator (working machine),
2: undercarriage,
3: upperstructure,
4: front working device,
4a: boom,
4b: arm,
4c: bucket,
4d, 4e, 4f: hydraulic cylinders,
5: swing frame,
6: counterweight,
7: cab,
7a: front window,
7b: left side window,
7c: right side window,
7d: rear window,
8: battery,
9: crawlers,
10: seat,
11: travel control lever,
12: front control lever,
13: gate lock lever (lock operating element),
14: push button,
15: key switch,
16: projection device,
17: combiner,
18: cautions,
19: decal,
20: controller,
21: CPU,
22: ROM,
23: RAM.

The invention claimed is:

1. A working machine provided with a cab for its operator to ride in, comprising:
   a projection device that projects image light to form an image of cautions to an operator who operates the working machine;
   a combiner that displays image light projected by the projection device;
   a controller that controls the projection device; and
   a gate lock lever that allows the operator to switch between a locked state in which operation of the working machine is disabled and an unlocked state in which operation of the working machine is enabled;

wherein in a case where the gate lock lever is in the unlocked state, the controller displays the cautions on the combiner in a second display manner in which the cautions are more likely not to obstruct the view of the operator than in a first display manner of displaying the cautions in a case where the gate lock lever is in the locked state.

2. The working machine according to claim 1, comprising a momentary switch that is set in an ON state only while the switch is operated by the operator and is set in an OFF state in a case where the operator stops the switch operation;

wherein in a case where the momentary switch is in the ON state even with the gate lock lever remaining in the locked state, the controller displays the cautions on the combiner in the second display manner.

3. The working machine according to claim 1, wherein the second display manner is any of hiding the cautions, displaying the cautions smaller than displayed in the first display manner, and displaying the cautions near edges of a window relative to a display position in the first display manner.

* * * * *